Aug. 4, 1964 W. L. MORGAN II 3,143,727

MAGNETIC MEMORY AND SWITCHING CIRCUIT

Filed Sept. 30, 1959

INVENTOR
Walter L. Morgan II

BY Q. Baxter Warner
Claude Funkhouser
ATTORNEYS

United States Patent Office 3,143,727

Patented Aug. 4, 1964

3,143,727

MAGNETIC MEMORY AND SWITCHING CIRCUIT

Walter L. Morgan II, Princeton, N.J., assignor, by mesne assignments, to the United States of America as represented by the Secretary of the Navy Filed Sept. 30, 1959, Ser. No. 843,608
6 Claims. (Cl. 340—174)

This invention relates to magnetic shift registers and more particularly to an improved readout circuit for magnetic shift registers.

Digital storage devices of the shift register variety are utilized in computing circuitry to store serial pulse information in a cascaded array of magnetic cores, each successive core storing a successive bit of information. As new information is received at the input end of the shift register, information theretofore stored in the shift register cores is stepped along the shift register in a serial manner toward the output end thereof.

Each of the cores of a shift register normally employs an input winding, an output winding and a shift winding, wound upon each individual core. The output winding of a particular core drives the input winding of the following core through an artificial transmission line including a serial impedance and a shunt capacitance functioning as an intermediate storage element. A unilateral impedance or diode is interposed between the output winding and the aforementioned shunt capacitance to prevent pulses of an undesired polarity from reaching and charging the capacitance; for example, a diode poled to pass positive currents from an output winding will allow the capacitor to charge only upon production of a positive pulse by the output winding. The shunt capacitance then subsequently discharges through the serial impedance of the transmission line and the input winding of the next shift register core, but is prevented from discharging back into the output winding of the preceding core by the high reverse impedance of the aforementioned diode. Bits of information are successively stepped along the shift register by means of a shift pulse generator, connected to energize the shift windings on all the cores. At the occurrence of a shift pulse, positive pulses are thereby caused to appear at the output of cores containing a pulse of information previously inserted at the input thereof.

An important problem arises when it is desired to remove information from the shift register or detect a serial number which resides in the shift register, without feeding the information completely out of the shift register in a serial manner, thereby destroying the information for further uses. It is desirable to interrogate each of the cores of the shift register in a simultaneous or parallel fashion and without in any manner destroying the information residing in those cores.

This invention in general provides an improved arrangement for reading the information out of a shift register without destroying the information existing in the register. Parallel output storage cores are provided one each for a corresponding core of the shift register and each having input and output windings thereon. A unilateral impedance between one side of each of the shift register core output windings and corresponding input winding on the output core is poled to pass information of a predetermined polarity from the output windings to the storage cores; for example, positively poled diodes are used to permit positive pulses only to proceed from the output windings to the input windings on corresponding output cores. A source of readout pulses is also coupled to change the voltage level of each of the shift register output windings. This source of pulses is normally maintained at such a voltage level that the aforementioned diodes cannot conduct regardless of the polarity of pulses appearing at the shift register output windings. However, when the source of readout pulses is operated, it produces a pulse of substantially ground level or other innocuous magnitude so that signals from the shift register output windings will reach the output cores if they are of the proper polarity as dictated by the diode. The source of readout pulses is arranged to operate substantially simultaneously with the shift pulses applied to the shift windings of the shift register and information is thereby selectively transferred to output cores simultaneously with its transmission along the shift register.

Accordingly, an object of this invention is to provide an improved readout circuit for magnetic shift registers.

Another object of this invention is to provide an improved readout circuit for magnetic shift registers employing a minimum of auxiliary equipment.

It is another object of this invention to provide an improved readout circuit for magnetic shift registers which transfers information to an output storage simultaneously with serial transfer in the shift register.

It is a further object of this invention to provide an improved means for securing parallel output from the cores of a magnetic shift register.

Other objects and many of the attendant advantages of this invention will be readily appreciated as the same becomes better understood by reference to the following detailed description when considered in connection with the accompanying drawings showing by way of example one embodiment of the invention, wherein.

Figures 1, 2:
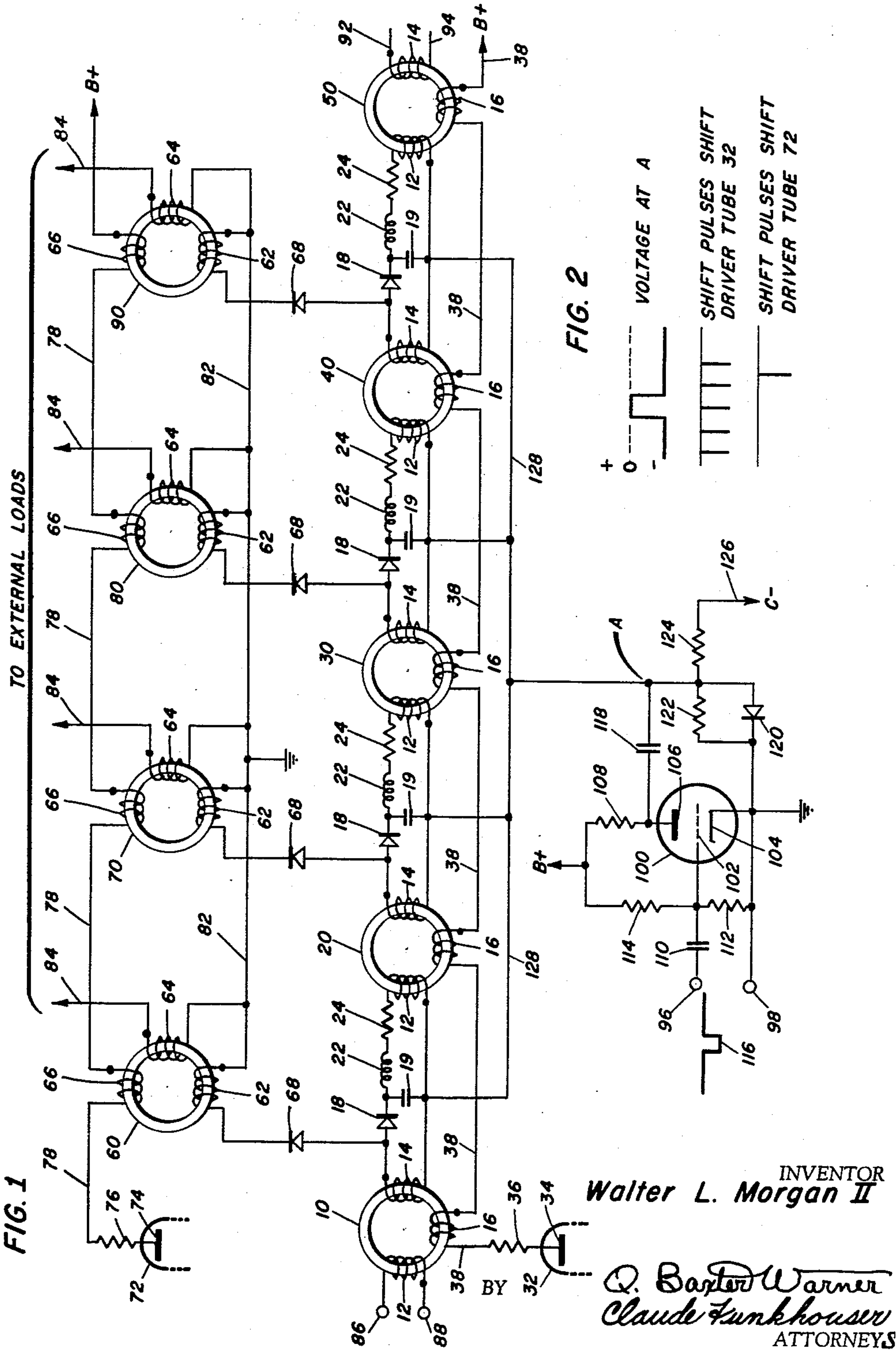
FIG. 1 is a circuit diagram of the invention.
FIG. 2 is a diagrammatic representation of pulse timing occurring in the present invention.

Referring to FIG. 1, a magnetic shift register is composed of toroidal magnetic cores 10, 20, 30, 40 and 50 connected in cascade. Toroidal magnetic cores 60, 70 80 and 90 are employed as output storage devices to temporarily indicate in parallel fashion the binary representation stored in the shift register. Each of the cores is constructed of a magnetic material having a substantially rectangular hysteresis loop, that is having two remnant conditions of substantial flux saturation, such materials being well known in the art. Each of the cores has wound thereon an input winding, an output winding, and a shift winding. In the case of the shift register cores the input winding is designated at 12, the output winding at 14 and the shift winding at 16. The input winding of the output storage cores is designated at 62, the output winding at 64, and the shift winding at 66.

Each of these windings shown in FIG. 1 has a dotted end and a nondotted end, according to the convention of polarity presently employed for transformers and magnetic core devices. A positive pulse input to the dotted end of a winding will produce a positive pulse output at the dotted ends of the other windings on the core, providing the core is not already in a positive state of flux saturation. If the core is already in a positive state of flux saturation no output will be produced. Likewise, a negative input pulse at the dotted end of any one of the windings will produce a negative output pulse at the dotted end of any one of the other windings provided the intermediate core is not already in a negative state of flux saturation. If the core is already in a negative state of flux saturation no output will be produced. Introducing a positive pulse at the nondotted end of a winding is equivalent to introducing a negative pulse at the dotted end and vice versa.

Therefore, considering core 10 and the windings thereon, a positive pulse introduced at terminal 86 with respect to terminal 88, i.e., introduced at the nondotted end of winding 12, will cause core 10 to saturate in a negative direction. There will be produced thereby a negative output from winding 14 but diode 18 connected between the dotted end of winding 14 and the remaining circuitry will prevent the transfer of information to capacitor 19 or core 20, and likewise diode 68 will prevent transfer to output core 60. However, when the next periodic shift pulse is received at winding 16 of core 10 from plate 34 of shift pulse tube 32 through resistor 36, such pulse being of a negative polarity at the nondotted end of the winding, a positive output pulse will result at the dotted end of output winding 14 and will therefore transfer through diode 18 to charge capacitor 19. Capacitor 19 will subsequently discharge through inductance 22 and resistor 24 causing a negative flux saturation of core 20, since this discharge current flows through winding 12 from its nondotted end to its dotted end. It is seen that the pulse introduced into core 10 by means of winding 12 has subsequently been shifted into core 20 by the occurrence of a shift pulse from tube 32. Negative shift pulses occur periodically as illustrated in FIG. 2.

If no new information is introduced into core 10 at the next serial time for input information, core 10 will remain in a state of positive flux saturation and the next succeeding shift pulse introduced at winding 16 will produce no output at winding 14. Successive operation of cores 20, 30, 40 and 50, is identical to that described in connection with core 10. New serial information pulses may be introduced into input terminals 86 and 88 of the shift register during the interim between shift pulses, the said information being thereafter shifted along the cascaded register by the shift pulses from tube 32.

According to the present invention, when information is being shifted from one core to the next along the shift register as aforesaid through diode 18, such information may be transferred to an output storage core for example core 60, as desired. Since the pulse appearing at the dotted end of output winding 14 is positive, diode 68 will conduct providing the overall voltage level of the pulse from winding 14 reaches at least ground level at some time during the occurrence of the pulse. It is to be noted that the opposite end of winding 62 is grounded.

The operation of readout tube 100 determines the overall voltage level of the output pulses from each of the shift register cores as will now be described. Tube 100 is normally conducting since its grid 102 is returned to a positive voltage as determined by the voltage divider comprising resistors 112 and 114 in series from ground to B+ voltage. Cathode 104 is also grounded and plate 106 is supplied with B+ voltage through plate resistor 108. A voltage divider composed of resistors 122 and 124 is connected from ground to point 126, a point of high negative voltage. This voltage is chosen so that line 128 connected to the juncture between resistors 122 and 124, is normally maintained sufficiently negative to insure that the overall voltage level of output windings 14 never attains a positive potential even during the occurrence of output pulses. Therefore, diode 68 will never conduct during the conduction of tube 100 since each diode 68 is positively poled and connected to a winding 62 having its remaining end grounded through line 82.

However, when a negative pulse input 116 is applied to terminal 96 with respect to 98, a surge of current flows through capacitor 110 to drive grid 102 below cutoff voltage. Plate 106 thereby rises to substantially B+ causing a positive pulse to be transmitted through capacitor 118. Point A, the midpoint of the voltage divider would be driven positive but for positively poled clamping diode 120 shunted from point A to ground. Input pulse 116 is sufficiently long in time so that point A is maintained at a clamped ground level during the occurrence of the next shift pulse. Conductor 128 is therefore maintained at ground level during this period and if a positive going output pulse occurs at one of the windings 14 in the shift register during this time, it will now be sufficiently positive in level to pass through one of the diodes 68 causing a negative saturation of one of the output cores. This is because a positive current is introduced at the nondotted end of its winding 62.

When it is desired to readout information into the output cores, a readout pulse 116 is applied between terminals 96 and 98 starting slightly before and ending slightly after the occurrence of the regular periodic shift pulse as illustrated in FIG. 2. Point A will be raised to near ground potential and therefore so will the voltage levels of output core windings 14 on the shift register cores. When the shift pulse occurs on shift windings 16, the corresponding outputs occurring at windings 14 will not only energize capacitor 19 through diode 18, but will also be sufficiently positive to energize corresponding input windings 62 on the output cores through the respective positively poled diodes 68. Each winding 62 will magnetize the respective output core to correspond in magnetization with the respective corresponding shift register core. At the conclusion of the shift pulse from tube 32, not only will information have been stepped one core along the register, but also such information will reside in parallel fashion in output cores 60, 70, 80 and 90.

Output winding 64 on each of the output cores is grounded at one end thereof, and provides at the other end thereof an output terminal 84 to energize an external load. Shift driver tube 72 has its plate 74 connected through load resistor 76 to line 78 including shift windings 66 of each output core in series. When it is desired to read the information from the output cores to the external loads, shift driver tube 72 is caused to operate returning the output cores to their original quiescent magnetization condition and inducing the desired outputs in windings 64. The shift pulse from tube 72 can be initiated at any arbitrarily chosen time provided such occurrence is before the time desired to read further information from the shift register into the output cores; that is, before the occurrence of the next readout pulse 116. The arbitrary relationship between the shift pulse from tube 72 with respect to the other circuit signals is illustrated in FIG. 2. Each of the output cores operates identically.

By means of the present invention, information can be read out of the shift register at the same time information is stepped along the shift register, whenever a readout pulse 116 is applied to the readout circuit including tube 100. Although, the shift register core output windings drive a double load whenever information is also applied to the output cores, it has been found in practice that no material loss of signal results, and no losses of information occur. The information in the shift register is read out into the output cores whenever desired without in any way altering the operation or effectiveness of the shift register and without destroying the information stored therein.

Although a shift register comprising five cores is shown in the figures, it is understood that the present circuit is applicable to shift registers having a greater or lesser number of cascaded cores or to other storage devices employing serial shift pulses. Also, it is apparent that other temporary output storage means may be used in place of the output magnetic cores employed in the illustrated embodiment.

Obviously many other modifications and variations of the present invention are possible in the light of the above teachings. It is therefore to be understood that within the scope of the appended claims the invention may be practiced otherwise than as specifically described.

What is claimed is:

1. In a shift register which includes a plurality of memory elements each having an input circuit, an output circuit for driving the input circuit of the next memory element, and a shift circuit, the combination with said register of a plurality of output storage elements one for each of said memory elements, gating means between the output circuits of each of said memory elements and the corresponding output storage element, shifting means connected to said shift circuit for producing shift pulses to transfer information serially along said shift register, and selectively timed pulse means for raising the voltage level through said output windings to said gating means to allow said gating means to conduct and simultaneously transfer said information from said memory elements to said output storage elements at the same time that information is being sequentially shifted from one memory element to another.

2. In a shift register which includes a plurality of magnetic cores of high magnetic remanence adapted to shift bits of information from one core to the next and including an input winding on each core, an output winding on each core for driving the input winding on the next core, and a shift winding on each core, the combination with said register of a plurality of output cores each having high magnetic remanence and at least an input winding thereon, diode rectifiers between the output windings of each of the shift register cores and the input windings on corresponding output cores, said diodes being poled to pass information from said shift register toward said output cores, shifting means producing shift pulses for connection to said shift windings, voltage divider means for impressing a high negative potential said output windings, and means for changing the voltage level of said output windings to selectively change the voltage level of said output windings from such a voltage as would not allow said diodes to conduct to a voltage level which does allow said diodes to conduct from said output windings to said output storage cores simultaneously transferring information from the output windings to the storage cores at the same time that information is being sequentially shifted from one shift register core to another.

3. In a shift register which includes a plurality of magnetic cores of high magnetic remanence adapted to shift bits of information from one core to the next, and including an input winding on each core, an output winding on each core for driving the input winding on the next core, and a shift winding on each core, the combination with said register of a plurality of parallel output cores corresponding to the cores of said shift register and each of said output cores having an input winding, an output winding, and a shift winding thereon, a plurality of diodes coupled between the remaining ends of the output windings of said shift register and corresponding input windings on said output cores, and pulse means providing pulses at the time of serial transfer along said shift register for raising the voltage level through said output windings to said diodes to allow simultaneous conduction of stored information to said output cores and to said shift register cores.

4. In a shift register which includes a plurality of magnetic cores of high magnetic remanence adapted to shift bits of information from one core to the next, and including an input winding on each core, an output winding on each core for driving the input winding on the next core, and a shift winding on each core, and having a serially connected diode and impedance interposed between each of said output windings and the succeeding input winding and an intermediate storage capacitor shunted from the serial interconnection to the remaining side of said output winding, the combination with said register of a plurality of output cores corresponding to the cores of said shift register and each having an input winding thereon, a diode interposed between each of the output windings on said shift register cores and the input winding on the corresponding output core, said diode being connected at the same end of the output winding as said serially connected diode, and with a like polarity with respect to said output winding, and a selectively timed pulse means connected to said remaining side of said output winding for normally allowing during non-pulse periods of said pulse means a quiescent polarity state for the prevention of conduction of said diodes connected to the output cores and for allowing during pulse periods simultaneous conduction of stored information to said output cores and to said shift register cores.

5. In combination with a shift register core having an output winding, a parallel output core having an input winding, diode means coupled between one end of said output winding and said input winding for passing pulse information from said output winding to said input winding, and a relatively low impedance pulse means connected to said output winding for raising the voltage level through said output winding to said diode transferring information to the input winding simultaneously with a transfer of information from the shift register core.

6. A magnetic memory and switching circuit comprising a plurality of memory elements each having an input winding and an output winding and a shift winding, the output winding of each element being connected to the input winding of the succeeding element, said output and input windings being connected according to reverse polarity, a unidirectional device and an impedance serially connected in one lead of each output winding, a storage capacitor shunt-connected across each output winding and located between the junction of the unidirectional device and the impedance and the remaining lead of the output winding, a plurality of output storage elements each having an input winding and an output winding and a shift winding, means connecting the output winding of each memory element with the input winding of a storage element, a unidirectional device in each connecting means poled to pass information from the memory device to the storage device, shifting means connected to the shift windings of the memory elements for sequentially shifting information along the plurality of memory elements when information is applied to the input winding of the first memory element, a voltage divider for applying a high negative potential to each unidirectional device in each means connecting the memory and storage elements, and means connected to the remaining lead of each output winding of the memory elements for providing pulses at the time information is sequentially shifted along the memory elements for raising the potential on the unidirectional devices in the connecting means thereby offsetting the high negative potential on said unidirectional devices so that they will conduct and simultaneously transfer information from the memory elements to the output storage elements at the same time that information is being sequentially shifted from one memory element to another.

References Cited in the file of this patent

UNITED STATES PATENTS

| | | |
|---|---|---|
| 2,846,669 | McMillan | Aug. 5, 1958 |
| 2,863,138 | Hemphill | Dec. 2, 1958 |
| 2,979,702 | Zarcone et al. | Apr. 11, 1961 |